United States Patent
Iida et al.

(10) Patent No.: US 11,244,173 B2
(45) Date of Patent: *Feb. 8, 2022

(54) IMAGE DISPLAY APPARATUS

(71) Applicant: TOYOTA JIDOSHA KABUSHIKI KAISHA, Toyota (JP)

(72) Inventors: Tomoaki Iida, Okazaki (JP); Tomoyuki Yoshida, Nisshin (JP); Kazuhiko Nakamoto, Miyoshi (JP); Tomohiro Miyazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,474

(22) Filed: May 9, 2019

(65) Prior Publication Data
US 2019/0347490 A1 Nov. 14, 2019

(30) Foreign Application Priority Data
May 11, 2018 (JP) .............. JP2018-092172

(51) Int. Cl.
G06K 9/00 (2006.01)
B60R 11/04 (2006.01)
G06T 3/40 (2006.01)

(52) U.S. Cl.
CPC .......... *G06K 9/00791* (2013.01); *B60R 11/04* (2013.01); *G06T 3/40* (2013.01)

(58) Field of Classification Search
CPC ........ G06K 9/00791; B60R 11/04; G06T 3/40
See application file for complete search history.

(56) References Cited

U.S. PATENT DOCUMENTS 8,423,903 B2 * 4/2013 Pearce ................ G06F 3/0481
715/799
8,665,331 B2 * 3/2014 Onaka ...................... B60R 1/00
348/148

(Continued)

FOREIGN PATENT DOCUMENTS

DE 10 2016 112817 A1 1/2017
EP 3176035 A1 6/2017

(Continued)

OTHER PUBLICATIONS

Notice of Allowance dated May 4, 2020 in U.S. Appl. No. 16/549,512.

(Continued)

*Primary Examiner* — Brian P Yenke
(74) *Attorney, Agent, or Firm* — Sughrue Mion, PLLC

(57) ABSTRACT

An image display apparatus is provided with: an imager configured to image a scene in surroundings of a vehicle; a display configured to display a captured image imaged by the imager; and a display controller configured to switch between a first display mode in which a first image is displayed and a second display mode in which a second image is displayed, wherein the first image is the captured image showing a first range out of the surroundings of the vehicle, and the second image is the captured image including at least a part of the first range and showing a second range, which is wider than the first range, out of the surroundings of the vehicle. The display controller displays the second image on the display in the second display mode in an aspect of clearly showing an area of the second image corresponding to the first image.

3 Claims, 3 Drawing Sheets

Standard image

Brackets (201)    Icon (202)

Wide angle image with standard image inside brackets

(56) References Cited

U.S. PATENT DOCUMENTS

| | | | |
|---|---|---|---|
| 8,717,196 B2* | 5/2014 | Wang | B60R 1/00 340/936 |
| 8,885,045 B2* | 11/2014 | Yanagi | B60R 1/00 348/148 |
| 9,332,231 B2* | 5/2016 | Lee | B60R 1/00 |
| 9,589,194 B2* | 3/2017 | Oshida | G06K 9/00805 |
| 9,930,296 B2* | 3/2018 | Aoki | H04N 5/23293 |
| 9,963,071 B2* | 5/2018 | Asai | B60R 1/00 |
| 10,019,965 B2* | 7/2018 | Segawa | H04N 5/23293 |
| 10,131,277 B2* | 11/2018 | Watanabe | H04N 7/18 |
| 10,183,621 B2* | 1/2019 | Hodohara | B60R 1/00 |
| 10,306,137 B2* | 5/2019 | Takahashi | H04N 5/23245 |
| 10,315,569 B2* | 6/2019 | Watanabe | G08G 1/16 |
| 10,363,876 B2* | 7/2019 | Onaka | H04N 5/23293 |
| 10,486,599 B2* | 11/2019 | Baur | B60R 1/00 |
| 10,857,943 B2* | 12/2020 | Asai | H04N 7/181 |
| 10,981,506 B2* | 4/2021 | Hayashida | B60R 1/00 |
| 11,034,305 B2* | 6/2021 | Yoshida | G06T 7/74 |
| 2005/0174429 A1* | 8/2005 | Yanai | B60R 1/00 348/148 |
| 2005/0180858 A1* | 8/2005 | Halgas, Jr. | H04N 7/0122 417/53 |
| 2007/0035625 A9 | 2/2007 | Hamdan et al. | |
| 2008/0007428 A1* | 1/2008 | Watanabe | B60R 1/00 340/901 |
| 2008/0106389 A1* | 5/2008 | Desai | B60R 1/1207 340/425.5 |
| 2010/0134325 A1* | 6/2010 | Gomi | G03B 37/04 340/995.14 |
| 2010/0194596 A1* | 8/2010 | Wang | B60R 1/00 340/936 |
| 2011/0149077 A1* | 6/2011 | Robert | B60R 1/00 348/148 |
| 2011/0317014 A1* | 12/2011 | Onaka | B60R 1/00 348/148 |
| 2012/0033123 A1 | 2/2012 | Inoue et al. | |
| 2012/0069187 A1 | 3/2012 | Ozaki et al. | |
| 2012/0154591 A1 | 6/2012 | Baur et al. | |
| 2012/0169875 A1 | 7/2012 | Matsukawa et al. | |
| 2012/0274737 A1 | 11/2012 | Kuboyama et al. | |
| 2013/0093889 A1* | 4/2013 | Headley | B60R 1/00 348/148 |
| 2013/0293683 A1 | 11/2013 | Zhou et al. | |
| 2014/0132527 A1 | 5/2014 | Wu | |
| 2014/0300740 A1* | 10/2014 | Fujioka | H04N 7/183 348/148 |
| 2014/0313359 A1* | 10/2014 | Hwang | H04N 5/23238 348/218.1 |
| 2015/0191118 A1 | 7/2015 | Matsukawa et al. | |
| 2015/0197197 A1* | 7/2015 | Watanabe | B60R 1/00 348/118 |
| 2015/0302259 A1* | 10/2015 | Oshida | G06K 9/46 382/103 |
| 2016/0059781 A1* | 3/2016 | Tatara | B60R 1/00 348/148 |
| 2016/0114727 A1* | 4/2016 | Watanabe | H04N 7/18 348/118 |
| 2016/0129837 A1 | 5/2016 | Zhu | |
| 2016/0134845 A1* | 5/2016 | Asai | H04N 5/268 348/234 |
| 2016/0142685 A1* | 5/2016 | Aoki | H04N 5/23293 348/148 |
| 2016/0185292 A1* | 6/2016 | Asai | B60R 1/00 348/148 |
| 2016/0191794 A1 | 6/2016 | Varonos | |
| 2016/0227123 A1 | 8/2016 | Nagase et al. | |
| 2016/0231977 A1 | 8/2016 | Yamada et al. | |
| 2017/0028921 A1 | 2/2017 | Asai | |
| 2017/0082583 A1* | 3/2017 | Tarafder | G01N 30/30 |
| 2017/0082853 A1* | 3/2017 | Yoshimoto | G02B 27/0101 |
| 2017/0094189 A1* | 3/2017 | Ogawa | G03B 15/16 |
| 2017/0099430 A1* | 4/2017 | Fukui | H04N 5/23216 |
| 2017/0129405 A1* | 5/2017 | Oba | B60R 1/08 |
| 2017/0132480 A1* | 5/2017 | Han | G06T 3/40 |
| 2017/0161566 A1* | 6/2017 | Sung | H04N 5/247 |
| 2017/0232898 A1* | 8/2017 | Maejima | H04N 5/247 348/118 |
| 2017/0249923 A1* | 8/2017 | Segawa | H04N 5/232 |
| 2017/0297496 A1* | 10/2017 | Onaka | H04N 7/181 |
| 2017/0371156 A1* | 12/2017 | Heishi | B60K 35/00 |
| 2018/0093619 A1* | 4/2018 | Han | G06K 9/00791 |
| 2018/0152674 A1* | 5/2018 | Aoki | H04N 5/23293 |
| 2018/0160030 A1* | 6/2018 | Chaney, Jr. | B60R 1/06 |
| 2018/0183996 A1* | 6/2018 | Takahashi | H04N 5/2628 |
| 2018/0222489 A1* | 8/2018 | Boran | B60W 50/0098 |
| 2018/0262687 A1* | 9/2018 | Hildreth | H04N 13/204 |
| 2018/0345790 A1* | 12/2018 | Mimura | B60K 35/00 |
| 2018/0345988 A1* | 12/2018 | Mimura | B60W 50/082 |
| 2018/0345991 A1* | 12/2018 | Mimura | B62D 15/0265 |
| 2018/0348758 A1* | 12/2018 | Nakamura | B60W 50/00 |
| 2018/0373250 A1* | 12/2018 | Nakamura | G06K 9/00228 |
| 2019/0071015 A1* | 3/2019 | Inagaki | B60R 1/00 |
| 2019/0135191 A1 | 5/2019 | Sunagawa et al. | |
| 2019/0161624 A1* | 5/2019 | Moriguchi | C08J 7/0427 |
| 2019/0236343 A1* | 8/2019 | Konishi | G06T 7/20 |
| 2019/0248288 A1* | 8/2019 | Oba | G06T 3/0006 |
| 2019/0359141 A1* | 11/2019 | Iida | B60R 11/04 |
| 2019/0361501 A1* | 11/2019 | Park | G06F 1/16 |
| 2020/0020235 A1* | 1/2020 | Smith | G06K 9/00805 |
| 2020/0070723 A1* | 3/2020 | Asai | G06T 3/40 |
| 2020/0079307 A1* | 3/2020 | Asai | B60R 16/033 |
| 2020/0094744 A1* | 3/2020 | Baur | B60R 1/00 |
| 2020/0104604 A1* | 4/2020 | Yoshikawa | G05D 1/0246 |
| 2021/0099662 A1* | 4/2021 | Arakawa | H04N 5/2628 |
| 2021/0155167 A1* | 5/2021 | Lynam | B60R 1/06 |
| 2021/0279477 A1* | 9/2021 | Tsunashima | H04N 5/232945 |

FOREIGN PATENT DOCUMENTS

| | | |
|---|---|---|
| JP | 2003-095028 A | 4/2003 |
| JP | 2008-148059 A | 6/2008 |
| JP | 2008-301091 A | 12/2008 |
| JP | 2010-274813 | 12/2010 |
| JP | 2012-140106 A | 7/2012 |
| JP | 2012-195793 A | 10/2012 |
| JP | 2014-27353 A | 2/2014 |
| JP | 2015-202769 A | 11/2015 |
| JP | 2016-124391 A | 7/2016 |
| JP | 2017-058600 A | 3/2017 |
| WO | 2017/199888 A1 | 11/2017 |

OTHER PUBLICATIONS

U.S. Appl. No. 16/549,512, filed Aug. 23, 2019.
U.S. Appl. No. 16/411,564, filed May 14, 2019.
Office Action dated Oct. 31, 2019 in U.S. Appl. No. 16/411,564.
Notice of Allowance dated Jan. 23, 2020 in U.S. Appl. No. 16/411,564.
Notice of Allowance dated Aug. 5, 2020, which issued during the prosecution of U.S. Appl. No. 16/549,512.

* cited by examiner

Standard image

Brackets (201)    Icon (202)

Wide angle image with standard image inside brackets

Frame (203)

Wide angle image with standard image inside frame

Area (204)

Wide angle image with standard image inside high contrast area

IMAGE DISPLAY APPARATUS

CROSS-REFERENCE TO RELATED APPLICATIONS

This application is based upon and claims the benefit of priority of the prior Japanese Patent Application No. 2018-092172, filed on May 11, 2018, the entire contents of which are incorporated herein by reference.

BACKGROUND

1. Technical Field

Embodiments of the present disclosure relate to an image display apparatus.

2. Description of the Prior Art

For this type of apparatus, for example, there is proposed an electron mirror apparatus configured to change a rear side range of the left and right of a vehicle, which is to be displayed, in a forward movement and in a backward movement of the vehicle, wherein an captured image corresponding to a general door mirror (or side mirror) is displayed on a display in the forward movement of the vehicle, and a captured image showing a broader range than that in the forward movement is displayed on the display in the backward movement (refer to Japanese Patent Application Laid Open No. 2016-124391 (Patent Literature 1)). Another related technology/technique is described in Japanese Patent Application Laid Open No. 2017-058600 (Patent Literature 2).

If a display image is switched from one image to another image that shows a broader range than that of the one image, a size of an object captured in both of the one image and the other image may decrease due to the switching from the one image to the other image. Then, a user who sees the display image before and after the switching from the one image to the other image possibly misunderstands or is possibly under a mistaken impression that the object goes far away. This is not considered in the Patent Literatures 1 and 2.

In view of the aforementioned problems, it is therefore an object of embodiments of the present disclosure to provide an image display apparatus that can prevent the misunderstanding caused by the switching of the display image.

The above object of embodiments of the present disclosure can be achieved by an image display apparatus provided with: an imager configured to image a scene in surroundings of a vehicle; a display configured to display a captured image imaged by the imager; and a display controller configured to switch between a first display mode in which a first image is displayed and a second display mode in which a second image is displayed, wherein the first image is the captured image showing a first range out of the surroundings of the vehicle, and the second image is the captured image including at least a part of the first range and showing a second range, which is wider than the first range, out of the surroundings of the vehicle, wherein the display controller is configured to display the second image on the display in the second display mode in an aspect of clearly showing an area of the second image corresponding to the first image.

DETAILED DESCRIPTION OF THE EMBODIMENT

An image display apparatus according to an embodiment of the present disclosure will be explained with reference to FIG. 1 to FIG. 4.

(Configuration)

Figure 1:
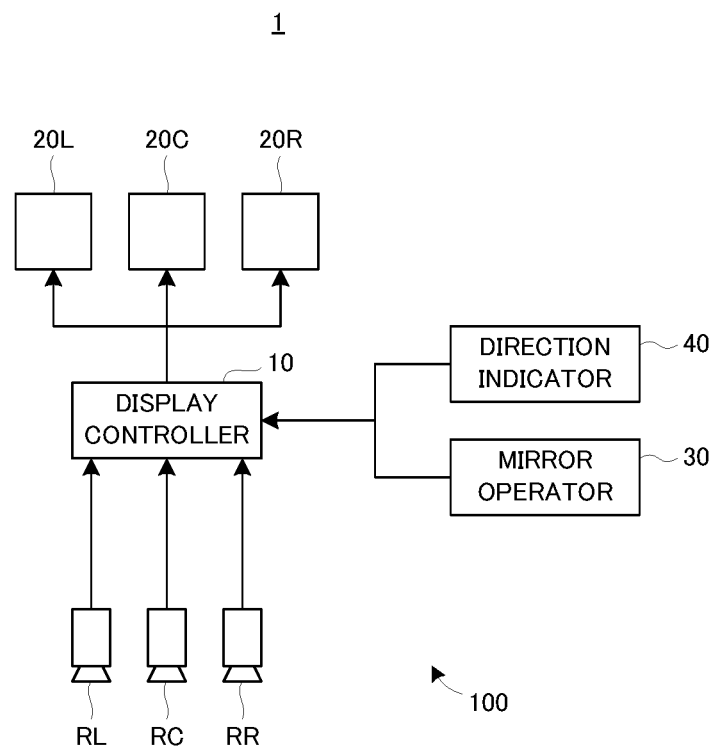
FIG. 1 is a block diagram illustrating a configuration of an image display apparatus according to an embodiment.

A configuration of the image display apparatus according to the embodiment will be explained with reference to FIG. 1. FIG. 1 is a block diagram illustrating the configuration of the image display apparatus according to the embodiment.

In FIG. 1, an image display apparatus 100 is mounted on a vehicle 1. The image display apparatus 100 is provided with a display controller 10, a left display 20L, a central display 20C, a right display 20R, a mirror operator 30, and cameras RL, RC, and RR. In the embodiment, the image display apparatus 100 corresponds to a so-called electronic mirror.

The camera RL is a camera for imaging a scene on a rear left side of the vehicle 1. The camera RC is a camera for imaging a scene on a rear of (i.e., right behind) the vehicle 1. The camera RR is a camera for imaging a scene on a rear right side of the vehicle 1. The left display 20L is configured to display an image imaged by the camera RL. The central display 20C is configured to display an image imaged by the camera RC. The right display 20R is configured to display an image imaged by the camera RR.

Figure 2:
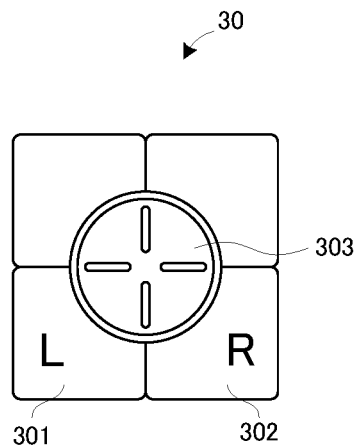
FIG. 2 is a diagram illustrating an example of a mirror operator according to the embodiment.

The mirror operator 30 is provided, as illustrated in FIG. 2, with an L button 301 (i.e., a button for operating the left display 20L), an R button 302 (i.e., a button for operating the right display 20R), and a direction button 303. For example, if the direction button 303 is operated while the L button 301 is pressed down, the direction of the camera RL (particularly, the direction of an optical axis) is changed in accordance with the operation of the direction button 303. As a result, an imaging range of the camera RL is shifted in a direction corresponding to the operation of the direction button 303. In the same manner, if the direction button 303 is operated while the R button 302 is pressed down, the direction of the camera RR (particularly, the direction of an optical axis) is changed in accordance with the operation of the direction button 303. As a result, an imaging range of the camera RR is shifted in a direction corresponding to the operation of the direction button 303. Moreover, the mirror operator 30 is also operated to switch between image display modes (e.g., to switch between a standard mode and a wide angle mode), as described later.

When respectively displaying the images imaged by the cameras RL, RC, and RR on the left display 20L, the central display 20C, and the right display 20R, the display controller 10 is configured to display the images in any of the standard mode in which an image corresponding to a predetermined imaging range is displayed, and the wide angle mode in which an image corresponding to a wider range than the predetermined imaging range is displayed.

Specifically, in a situation in which the images are displayed in the standard mode on the left display 20L and the right display 20R, if the direction button 303 is operated by a user (mainly, a driver) of the vehicle 1 while none of the L button 301 and the R button 302 of the mirror operator 30 is pressed down, the display controller 10 may respectively display the images imaged by the camera RL and RR in the wide angle mode on the left display 20L and the right display 20R. In a situation in which the images are displayed in the wide angle mode on the left display 20L and the right display 20R, if any of the L button 301, the R button 302, and the direction button 303 is pressed down or operated by the user of the vehicle 1, the display controller 10 may respectively display the images imaged by the camera RL and RR in the standard mode on the left display 20L and the right display 20R.

In a situation in which the images are displayed in the standard mode on the left display 20L and the right display 20R, if a direction indicator 40 mounted on the vehicle 1 is operated, the display controller 10 may display the image to be displayed on one of the left display 20L and the right display 20R, which corresponds to a direction (i.e., one of left and right) indicated by the direction indicator 40, in the wide angle mode. In a situation in which the image on one of the left display 20L and the right display 20R is displayed in the wide angle mode due to the operation of the direction indicator 40, if a predetermined time passes from a time point of the start of the operation of the direction indicator 40, the display controller 10 may display the image to be displayed on one of the left display 20L and the right display 20R in the standard mode.

(Display Image)

Figure 3A:
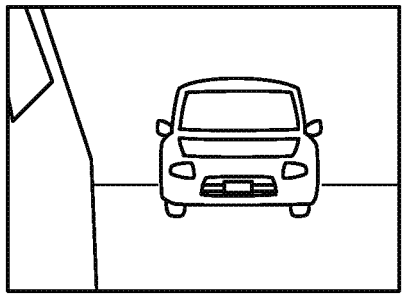
FIG. 3A is a diagram illustrating an example of a display image.
Figure 3B:
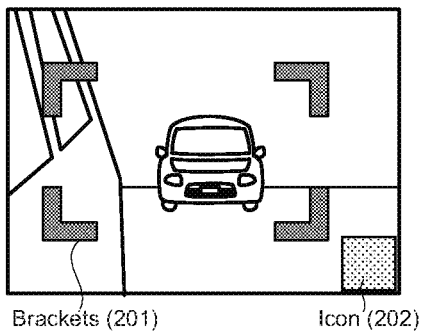
FIG. 3B is a diagram illustrating an example of the display image.
Figure 3C:
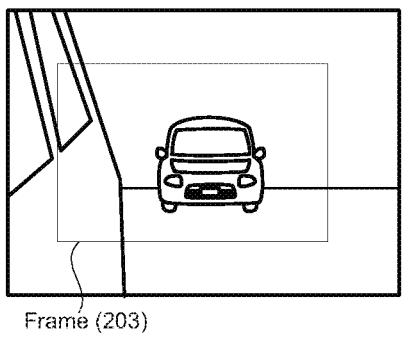
FIG. 3C is a diagram illustrating an example of the display image.
Figure 3D:
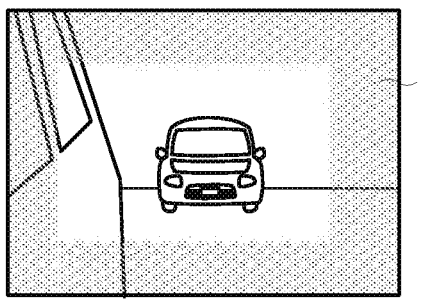
FIG. 3D is a diagram illustrating an example of the display image.

Images associated with the standard mode and the wide angle mode will be explained with reference to FIG. 3A to FIG. 3D. FIG. 3A illustrates an example of the image associated with the standard mode, and FIG. 3B to FIG. 3D illustrate examples of the image associated with the wide angle mode.

Firstly, an explanation will be given to an example of a method of generating the images associated with the standard mode and the wide angle mode. The first generation method is to cut out, i.e., trim, a part of the image imaged by each of the cameras RL, RC, and RR. In this case, in the standard mode, an image corresponding to the predetermined imaging range is cut out from an image corresponding to an entire imaging range of each of the cameras RL, RC, and RR, by which the image associated with the standard mode (hereinafter referred to a "standard image" as occasion demands) is generated. In the wide angle mode, an image corresponding to a wider range than the predetermined imaging range is cut out from the image corresponding to the entire imaging range of each of the cameras RL, RC, and RR, by which the image associated with the wide range mode (h₀reinafter referred to as a "wide angle image" as occasion demands) is generated. The "wider range than the predetermined imaging range" may be the entire imaging range of each of the cameras RL, RC, and RR.

The second generation method is to change a focal distance of each of the cameras RL, RC, and RR (i.e., zoom in/zoom out). In this case, in the standard mode, the standard image is generated by imaging an image with each of the cameras RL, RC, and RR whose focal distance is set to be longer than that in the wide angle mode. In the wide angle mode, the wide angle image is generated by imaging an image with each of the cameras RL, RC, and RR whose focal distance is set to be shorter than that in the standard mode.

A method obtained by combining the first and second generation methods may be used to generate at least one of the image associated with the standard mode and the image associated with the wide angle mode.

By the way, both the standard image and the wide angle image are enlarged or reduced in accordance with an image size when being displayed on any of the left display 20L, the central display 20C, and the right display 20R. Thus, even if the same object is imaged at the same time point by one of the cameras RL, RC, and RR, a display size of the object in the standard image (i.e., a size on the screen) is greater than a display size of the object in the wide angle image. In other words, the display size of the object in the wide angle image is less than the display size of the object in the standard image.

As a result, when the standard image is switched to the wide angle image, the user (mainly, the driver) of the vehicle 1 possibly misunderstands that the object goes far away from the vehicle 1 due to a reduction in the display size of the object, even though a distance between the vehicle 1 and the object does not change.

Alternatively, when the wide angle image is switched to the standard image, the user of the vehicle 1 possibly misunderstands that the object approaches the vehicle 1 due to an increase in the display size of the object, even though the distance between the vehicle 1 and the object does not change.

Thus, when displaying the wide angle image on any of the left display 20L, the central display 20C, and the right display 20R, the display controller 10 is configured to display the wide angle image so that an area of the wide angle image corresponding to the standard image is clearly shown. Specifically, as illustrated in FIG. 3B, the display controller 10 may display brackets 201 in four corners of the area corresponding to the standard image, thereby clearly showing the area corresponding to the standard image. At this time, the display controller 10 may display an icon 202 indicating the wide angle mode on the wide angle image. Alternatively, as illustrated in FIG. 3C, the display controller 10 may display a frame 203 corresponding to an outer edge of the area corresponding to the standard image on the wide angle image, thereby clearly showing the area corresponding to the standard image. Alternatively, as illustrated in FIG. 3D, the display controller 10 may set a contrast of an area 204 of the wide angle image other than the area corresponding to the standard image to be lower than a contrast of the area corresponding to the standard image, thereby clearly showing the area corresponding to the standard image.

In the configuration in which the standard image and the wide angle image are generated by the second generation method described above, the display controller 10 may continuously change, for example, a position and a size of the brackets 201 or the like, which indicate the area of the wide angle image corresponding to the standard image, in accordance with a change in the focal distance with time of the corresponding camera (i.e., at least one of the cameras RL, RC, and RR) when switching from the standard image to the wide angle image.

In the configuration in which the standard image and the wide angle image are generated by the first generation method described above, a range cut out from the image (i.e., a trimming range) may be gradually increased or reduced with time, when the standard image is switched to the wide angle image or when the wide angle image is switched to the standard image. By virtue of such a configuration, as in the configuration in which the standard image and the wide angle image are generated by the second generation method, it is possible to realize such a video effect that, for example, the position and the size of the brackets 201 or the like, which indicate the area of the wide angle image corresponding to the standard image, continuously change in accordance with the change with time.

(Display Mode Switching Process)

Figure 4:
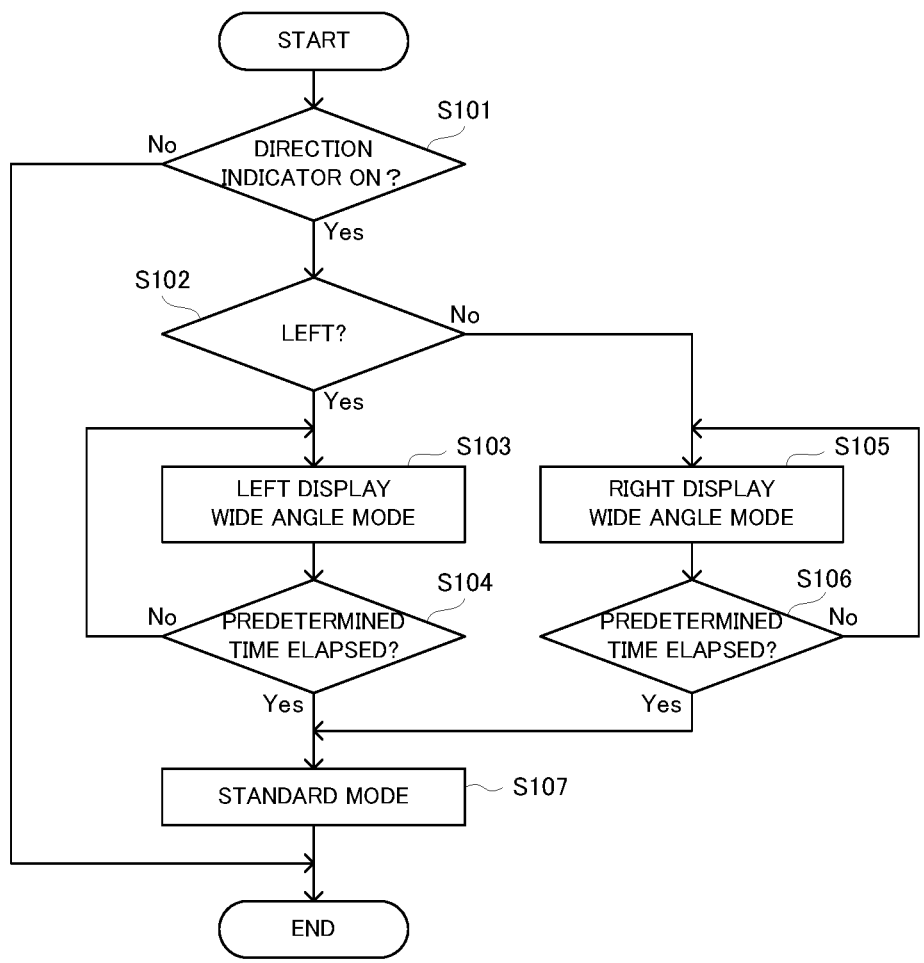
FIG. 4 is a flowchart illustrating a display mode switching process according to the embodiment.

With reference to a flowchart in FIG. 4, an explanation will be given to a switching process when the standard mode and the wide angle mode are switched by the display controller 10 regardless of the operation of the mirror operator 30. In FIG. 4, the display controller 10 determines whether or not the direction indicator 40 is in operation (step S101). In the step S101, if it is determined that the direction indicator 40 is not in operation (the step S101: No), the process illustrated in FIG. 4 is ended. Then, after a lapse of a predetermined period (e.g., several ten milliseconds to several hundred milliseconds), the step S101 is performed again. In other words, the process illustrated in FIG. 4 is repeated in a cycle corresponding to the predetermined period.

In the step S101, if it is determined that the direction indicator 40 is in operation (the step S101: Yes), the display controller 10 determines whether or not a direction indicated by the direction indicator 40 is left (step S102). In the determination in the step S102, if it is determined that the direction is left (the step S102: Yes), the display controller 10 displays the image imaged by the camera RL on the left display 20L in the wide angle mode (step S103).

The display controller 10 then determines whether or not a predetermined time elapses after the start of the display of the image imaged by the camera RL in the wide angle mode (step S104). In the step S104, if it is determined that the predetermined time does not elapse (the step S104: No), the step S103 is performed, i.e., the wide angle mode is maintained. In the step S104, if it is determined that the predetermined time elapses (the step S104: Yes), the display controller 10 displays the image imaged by the camera RL on the left display 20L in the standard mode (step S107).

Here, the "predetermined time" may be a value for determining whether or not the wide angle mode is switched to the standard mode, and may be typically set as a variable value corresponding to a speed of the vehicle 1. The "predetermined time" may be set, for example, on the basis of a relation between the speed of the vehicle 1 and a time for turning right or left at an intersection, which may be obtained by experiments, experiences, or simulations. If the vehicle 1 stops (e.g., at a red light, to wait for a pedestrian crossing a crossroad, etc.) after the start of the display in the wide angle mode and before a lapse of the predetermined time, a timer configured to measure a time after the start of the display in the wide angle mode may be stopped temporarily.

In the step S102, it is determined that the direction is not left (i.e., the direction is right) (the step S102: No), the display controller 10 displays the image imaged by the camera RR on the right display 20R in the wide angle mode (step S105). The display controller 10 then determines whether or not a predetermined time elapses after the start of the display of the image imaged by the camera RR in the wide angle mode (step S106). The predetermined time associated with the step S106 may be the same as the predetermined time associated with the step S104.

In the step S106, if it is determined that the predetermined time does not elapse (the step S106: No), the step S105 is performed, i.e., the wide angle mode is maintained. In the step S106, if it is determined that the predetermined time elapses (the step S106: Yes), the display controller 10 displays the image imaged by the camera RR on the right display 20R in the standard mode (the step S107).

(Technical Effect)

On the image display apparatus 100, when the wide angle image is displayed, the area of the wide angle image corresponding to the standard image is clearly shown (refer to FIG. 3B to FIG. 3D). Thus, the switching from the standard mode to the wide angle mode is visually indicated to the user of the vehicle 1. Therefore, according to the image display apparatus 100, it is possible to prevent the user from misunderstanding due to the switching between the standard image and the wide angle image.

<Modified Example>

When displaying the wide angle image, the display controller 10 may clearly show a change in the size of the object captured in both the standard image and the wide angle image, instead of or in addition to clearly showing the area of the wide angle image corresponding to the standard image. A method of clearly showing the change in the size of the object may include, for example, a method of displaying a gridline or the like indicating the size of the object in the standard image.

Various aspects of embodiments of the present disclosure derived from the embodiment and modified example explained above will be explained hereinafter.

An image display apparatus according to an aspect of embodiments of the present disclosure is provided with: an imager configured to image a scene in surroundings of a vehicle; a display configured to display a captured image imaged by the imager; and a display controller configured to switch between a first display mode in which a first image is displayed and a second display mode in which a second image is displayed, wherein the first image is the captured image showing a first range out of the surroundings of the vehicle, and the second image is the captured image including at least a part of the first range and showing a second range, which is wider than the first range, out of the surroundings of the vehicle, wherein the display controller is configured to display the second image on the display in the second display mode in an aspect of clearly showing an area of the second image corresponding to the first image.

In the aforementioned embodiment, the "cameras RL, RC, and RR" correspond to an example of the "imager", the "displays 20L, 20C, and 20R" correspond to an example of the "display", and the "display controller 10" corresponds to an example of the "display controller". The "standard mode" in the embodiment corresponds to an example of the "first display mode", and the "wide angle mode" corresponds to an example of the "second display mode". The "standard image" corresponds to an example of the "first image", and the "wide angle image" corresponds to an example of the "second image".

On the image display apparatus, the second image is displayed on the display in the second display mode in the aspect of clearly showing the area of the second image corresponding to the first image. Thus, a user of the image display apparatus can visually recognize which mode is used between the first display mode and the second display mode. Thus, even if the size of an object captured in the image (i.e., the first image and the second image) displayed on the display is changed due to the switching between the first display mode and the second display mode, it is possible to prevent the user from recognizing that a distance between the vehicle and the object is changed. In other words, according to the image display apparatus, it is possible to prevent the user from misunderstanding due to the switching between display images.

In an aspect of the image display apparatus, the aspect includes an aspect of clearly showing at least a part of a boundary of the corresponding area. By virtue of such a configuration, it is possible to clearly show the area of the second image corresponding to the first image, relatively easily.

An image display apparatus according to another aspect of embodiments of the present disclosure is provided with: an imager configured to image a scene in surroundings of a vehicle; a display configured to display a captured image imaged by the imager; and a display controller configured to switch between a first display mode in which a first image is displayed and a second display mode in which a second image is displayed, wherein the first image is the captured image showing a first range out of the surroundings of the vehicle, and the second image is the captured image including at least a part of the first range and showing a second range, which is wider than the first range, out of the surroundings of the vehicle, wherein the display controller is configured to display the second image on the display in the second display mode in an aspect of clearly showing a change in a size of an object, which is included in both the first image and the second image, due to a difference between the first display mode and the second display mode. According to the image display apparatus, as in the aforementioned image display apparatus according to the aspect of the present invention, it is possible to prevent the user from misunderstanding due to the switching between the display images.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An image display apparatus comprising:
    a right imager configured to image a rear right side of a vehicle;
    a left imager configured to image a rear left side of the vehicle;
    a right side electronic mirror display;
    a left side electronic mirror display; and
    a display controller configured to display a rear right side image, which is imaged by said right imager, on said right side electronic mirror display and to display a rear left side image, which is imaged by said left imager, on said left side electronic mirror display,
    wherein
    said display controller is configured to switch and display a first rear right side image and a second rear right side image, as the rear right side image imaged by said right imager, on said right side electronic mirror display wherein the first rear right side image shows a first rear right side range of the rear right side of the vehicle, the second rear right side image shows a second rear right side range, which is wider than the first rear right side range and includes at least a part of the first rear right side range, of the rear right side of the vehicle, and the second rear right side image shows a first range corresponding to the first rear right side range,
    said display controller is configured to switch and display a first rear left side image and a second rear left side image, as the rear left side image imaged by said left imager, on said left side electronic mirror display wherein the first rear left side image shows a first rear left side range of the rear left side of the vehicle, the second rear left side image shows a second rear left side range, which is wider than the first rear left side range and includes at least a part of the first rear left side range, of the rear left side of the vehicle, and the second rear left side image shows a second range corresponding to the first rear left side range,
    when a direction indicator of the vehicle is not in operation, said display controller is configured to display the first rear right side image on said right side electronic mirror display and to display the first rear left side image on said left side electronic mirror display,
    when the direction indicator indicates right direction, said display controller is configured to display the second rear right side image instead of the first rear right side image on said right side electronic mirror display and to display the first rear left side image on said left side electronic mirror display, and
    when the direction indicator indicates left direction, said display controller is configured to display the first rear right side image on said right side electronic mirror display and to display the second rear left side image instead of the first rear left side image on said left side electronic mirror display.

2. The image display apparatus according to claim 1, wherein
    the second rear right side image shows at least a part of a first boundary corresponding to the first range corresponding to the first rear right side range, and
    the second rear left side image show at least a part of a second boundary corresponding to the second range corresponding to the first rear left side range.

3. The image display apparatus according to claim 1, wherein
    the second rear right side image includes a first visual indicator identifying the first range corresponding to the first rear right side range, and
    the second rear left side image includes a second visual indicator identifying the second range corresponding to the first rear left side range.

* * * * *